United States Patent Office 3,725,144
Patented Apr. 3, 1973

3,725,144
HEAT TREATABLE CREEP RESISTANT SOLDER
Douglas J. Harvey, Sterling Heights, Mich., assignor to General Motors Corporation, Detroit, Mich.
No Drawing. Original application Apr. 16, 1968, Ser. No. 721,597, now Patent No. 3,600,164, dated Aug. 17, 1971. Divided and this application Feb. 4, 1971, Ser. No. 112,763
Int. Cl. C22f 1/12
U.S. Cl. 148—127      3 Claims

ABSTRACT OF THE DISCLOSURE

The creep resistance of an alloy consisting essentially of 10% to 20% bismuth, 0% to 5% tin, 0% to 0.2% of an element taken from the group of indium, cadmium and copper, and the balance lead can be improved by heating the alloy, preferably at about 300° to 400° F. for about one hour, and then cooling the alloy to normal room temperature.

---

This is a division of Ser. No. 721,597, filed Apr. 16, 1968, now U.S. 3,600,164, patented Aug. 17, 1971.

This invention relates to automobile copper-brass heat exchangers such as radiators, heater cores and the like, and more particularly to a heat treatable creep resistant lead-based solder for use in the fabrication of such heat exchangers.

For many years automobile radiators have been fabricated using lead-based solders. A commonly used lead solder alloy consists of 70% lead and 30% tin. While this solder has sufficient strength at room temperature to withstand the forces encountered in the operation of automobile heat exchangers, it is much weaker and more subject to failure at 220° F., which is approximately the normal operating temperature for such automotive components. The failure of a soldered joint under these circumstances is found to be due to the stress rupture, or creep rupture, of the lead-tin solder alloy at the operating temperature of the radiator. It is now desired to find a more creep resistant solder for joining heat exchanger sections. In general, lead-based compositions are preferred because of their relatively low melting point and the low cost of lead.

It is an object of this invention to provide a high strength, creep resistant lead-based alloy particularly suitable for use as a solder in the fabrication of automobile radiators and the like.

It is a further object of this invention to provide a lead-based solder alloy containing bismuth, or bismuth and tin, as the principal alloying constituents, which solder has a fifty hour rupture stress at 220° F. markedly greater than that of lead-based solder compositions now in use.

It is a further object of the present invention to provide a method of heat treating a tin-bismuth-lead solder alloy for purposes of increasing the creep resistance of the material.

These and other objects are accomplished in accordance with a preferred embodiment of the invention by employing a solder alloy comprising by weight 10%–20% bismuth, 0%–5% tin (preferably 2.5%–5% tin), and lead. Small amounts up to about two-tenths of a percent by weight of other alloying constituents such as indium, cadmium and copper may beneficially be added to the above-defined composition. The alloy is readily prepared by melting together the individual constituents to form a homogeneous liquid phase. The alloy is cast in a suitable form and/or extruded into readily usable solder wire.

A soldered joint is formed between two or more copper-brass heat exchanger members in accordance with conventional techniques. Upon solidification of the solder the joint is observed to have markedly improved strength, particularly at a temperature of about 220° F., as compared with that of the 70% lead—30% tin solder alloy. Solder alloys in accordance with my invention are capable of withstanding stresses of 400 p.s.i. at 220° F. for fifty hours or more prior to rupture. Moreover, after the solder joint has been formed the whole assembly may advantageously be reheated to a temperature in the range of about 275°–475° F. for a period sufficient to age harden the solder alloy, usually about one to two hours, and subsequently rapidly cooled to room temperature to obtain a further increase in the rupture strength of the joint.

It is now well known that metals and alloys may fail in service even though they may never have been subjected to a stress as great as their yield strength or their elastic limit as determined by the conventional short-time tensile test. The cause of these failures may be either one or the other of two phenomena known as "creep" and "fatigue." My invention relates to "creep" failure in lead-based solders.

When a metal or alloy is subjected to a tensile stress for a long period of time, particularly at temperatures above room temperature, it may gradually elongate or "creep." If the stress is maintained, and the temperature is high enough, the metal may continue to deform and eventually even fail. Of course, it follows that the rate of creep increases rapidly with temperature. Thus, while the conventional 70% lead—30% tin solder has a room temperature tensile strength of nearly 8,000 p.s.i. it has a fifty hour rupture stress of only 80 p.s.i. at 220° F. This means that rupture will occur in such an alloy in fifty hours when it is loaded to a stress of only 80 p.s.i. at 220° F.

I have discovered that alloys comprising by weight 10%–20% bismuth, 0%–5% tin and the balance lead have a fifty hour rupture stress at 220° F. in excess of 400 p.s.i. This is, of course, a substantially stronger solder than the conventional 70% lead—30% tin composition now employed. The alloys defined above melt at temperatures of about 500°—525° F. The 70% lead—30% tin solder melts at about 500° F. Therefore, it is expected that my solder compositions can be employed in substantially the same way and by the same equipment as are materials presently used in the fabrication of automotive radiator members.

Preferably, my solder composition comprises 2.5%–5% tin, 10%–20% bismuth and balance lead. I have found that the physical strength of the solder alloys are not adversely affected if small amounts of the constituents of the copper-brass radiator members are inadvertently dissolved therein during soldering operations. In fact, small amounts, up to about 0.2% by weight of elements such as copper, cadmium and indium are found to increase the fifty hour rupture stress at 220° F. of my composition. A particularly preferred composition combining the desirable features of low cost and superior physical properties consists of 11.7%–12% bismuth, 4.7%–5% tin and the balance lead.

I have conducted numerous tests which show the creep resistance of my composition. These tests were conducted by subjecting specimen of compositions defined above to a constant dead weight load at a temperature of 220° F.±1° F. until rupture occurred. The solder specimens were prepared by casting and extruding different alloys into the form of rods one-eighth inch in diameter. The extruded solder rod was mechanically reduced to 0.094 inch diameter in the test section thereof and brass strips were soldered to the ends of the rods to facilitate attachment of the specimens to the loading frame.

The specimens were subjected to a constant load at a temperature of 220° F. and the time at which rupture occurred was noted. A plot was made of load vs. the logarithm of the time to rupture at this constant temperature. In this way fifty hour rupture stress values were obtained for purposes of comparison of different alloys. Typical results are summarized in the table below in which all data was obtained at 220° F.

| Pb | Sn | Bi | Other | 50-hour rupture stress, 220° F., p.s.i. |
|---|---|---|---|---|
| 70 | 30 | | | 80 |
| Bal | | 17.0 | | 490 |
| Bal | | 20.0 | | 440 |
| Bal | 2.5 | 15.0 | | 440 |
| Bal | 2.5 | 18.0 | | 420 |
| Bal | 5.0 | 12.0 | | 450 |
| Bal | 5.0 | 15.0 | | 410 |
| Bal | 5.0 | 12.0 | 0.2 In | 470 |
| Bal | 5.0 | 12.0 | 0.2 Cd | 490 |
| Bal | 5.0 | 12.0 | 0.1 Cu | 480 |

It has been found that a tin content substantially in excess of 5% by weight markedly reduces the fifty hour rupture stress at 220° F. Bismuth in excess of 20% by weight reduces the rupture stress, increases the cost of composition and lowers the melting point. The composition nominally consisting of 5% tin, 12% bismuth and 83% lead is considered to be particularly suitable in accordance with my invention. As illustrated in the above table, the inclusion of up to about .2% by weight indium, cadmium or copper into my composition further increases the rutpre stress above that obtained with the base lead-tin-bismuth alloy.

I have found that the creep resistance of the above alloy is further increased by an age-hardening heat treatment. In many soldering applications, particularly automotive heat exchangers, relatively thin sections are used. When such a bonded assembly is air cooled immediately after soldering the rate of cooling is sufficiently rapid so that the joint is effectively quenched. Thus, any second phase which might otherwise precipitate from solid solution is trapped in solution. This appears to be the case with the subject alloy compositions. I have found that the rupture stress of representative alloys within the above-mentioned composition range is substantially increased by heating the alloy at a temperature somewhat below its melting point for a brief period of time and subsequently recooling. For example, when a composition comprising 5% tin, 12% bismuth and 83% lead was heated at 350° F. for one hour and recooled, the fifty hour rupture stress at 220° F. was noted to increase to 510 p.s.i. This is to be compared with a rupture stress of 450 p.s.i. found ni the nonheat-treated specimen.

The heat treatment of my alloy composition appears to be a time-temperature phenomenon. If in the first instance the alloy was solidified and cooled immediately to room temperature, it can be strengthened by reheating. The higher the temperature at which the alloy is reheated the shorter the time that is required before cooling to obtain the desired results. As a practical matter it seems preferable to conduct this heat treatment by heating the solder or soldered joint at a temperature of about 300°–400° F. for a period of about one hour. Temperatures below this range require more time for heat treatment. However, this seems unjustified, particularly if a production type operation is required. At temperatures above 400° F. less time is required. However, in a production type operation it would probably be difficult to obtain reproducible results due to overaging.

Lead-based alloys of my invention may be prepared by conventional means. Individual components are melted, thoroughly mixed and subsequently cast. If the alloy is to be used as a creep resistant solder it may be extruded or drawn into wire form for ease of application. As a solder it may be applied in the molten state to parts to be joined by well known means. After the solder has solidified and hardened to the point at which the assembly may be moved without damaging the new joint, it may then be heat treated as set forth above.

In normal soldering applications the assembly may be air cooled from the heat treat temperature without fear of overaging. However, it should be realized that as more massive sections of the alloy are used it may be necessary to seek more efficient means of cooling or shorter heating periods to avoid overaging.

Thus, while my invention has been described in terms of certain specific embodiments it is to be realized that other forms may readily be adapted by one skilled in the art and it is intended that my invention be limited only by the following claims.

What is claimed is:

1. A method of improving the creep resistance of an alloy consisting essentially by weight of 10%–20% bismuth, 2.5%–5% tin, 0%–0.2% of an element taken from the group consisting of indium, cadimum and copper, and the balance lead; said method comprising heating said alloy at a temperature in the range of about 300° F. to 400° F. for a time sufficient to age harden said alloy, and subsequently cooling said alloy to normal room temperature.

2. A method of improving the creep resistance of a lead-based alloy consisting essentially by weight of 10%–20% bismuth, 2.5%–5% tin, a small amount up to two-tenths of one percent of an element taken from the group consisting of indium, cadmium and copper, and the balance lead; said method comprising heating said alloy at a temperature of about 300° F. to 400° F. for a period of about one hour and then cooling the alloy to normal room temperature.

3. An improved method of soldering comprising applying molten solder to the metal parts which are to be joined, cooling the soldered joint to a temperature below the solidification range of said solder, heating said soldered joint at a temperature in the range of 300° F.–400° F. for a period up to about one hour, and then cooling to normal room temperature, said solder consisting essentially by weight of 10%–20% bismuth, 2.5%–5% tin, a small amount up to two-tenths of one percent of an element taken from the group consisting of indium, cadmium and copper, and the balance lead.

References Cited

UNITED STATES PATENTS 3,355,284   11/1967   Harvey _____ 148—158 X
3,411,961   11/1968   Harvey _____ 148—34 X

FOREIGN PATENTS 607,661   4/1926   France _____ 75—166 C
565,004   10/1944   Great Britain _____ 75—166 C

OTHER REFERENCES

Constitution of Binary Alloys, Hansen, pp. 324–327 and 1106–1109.

The Metal Industry, Mar. 5, 1943, pp. 150 and 151.

CHARLES N. LOVELL, Primary Examiner

U.S. Cl. X.R.

29—498, 504; 148—158